(12) United States Patent
Long et al.

(10) Patent No.: US 8,658,024 B2
(45) Date of Patent: Feb. 25, 2014

(54) CATALYST AND A METHOD FOR CRACKING HYDROCARBONS

(75) Inventors: Jun Long, Beijing (CN); Wenbin Jiang, Beijing (CN); Mingde Xu, Beijing (CN); Huiping Tian, Beijing (CN); Yibin Luo, Beijing (CN); Xingtian Shu, Beijing (CN); Jiushun Zhang, Beijing (CN); Beiyan Chen, Beijing (CN); Haitao Song, Beijing (CN)

(73) Assignees: China Petroleum & Chemical Corporation, Beijing (CN); Research Institute of Petroleum Processing, Sinopec, Beijing (CN)

( * ) Notice: Subject to any disclaimer, the term of this patent is extended or adjusted under 35 U.S.C. 154(b) by 0 days.

(21) Appl. No.: 13/565,145

(22) Filed: Aug. 2, 2012

(65) Prior Publication Data

US 2012/0292230 A1 Nov. 22, 2012

Related U.S. Application Data

(60) Division of application No. 12/813,110, filed on Jun. 10, 2010, which is a continuation of application No. 11/813,056, filed as application No. PCT/CN2005/002338 on Dec. 28, 2005, now abandoned.

(30) Foreign Application Priority Data

Dec. 28, 2004 (CN) .......................... 2004 1 0102810
Dec. 28, 2004 (CN) .......................... 2004 1 0102813

(51) Int. Cl.
*C10G 11/05* (2006.01)
*C10G 11/18* (2006.01)
*B01J 29/46* (2006.01)

(52) U.S. Cl.
USPC ........ 208/120.35; 208/114; 208/124; 502/66; 502/68; 502/71; 502/77; 502/213

(58) Field of Classification Search
USPC ........... 208/114, 120.35, 124; 502/66, 68, 74, 502/77, 84, 213
See application file for complete search history.

(56) References Cited

U.S. PATENT DOCUMENTS

| | | | |
|---|---|---|---|
| 3,293,192 A | 12/1966 | Maher et al. |
| 3,384,572 A | 5/1968 | Myers et al. |
| 3,506,440 A | 4/1970 | Sugimoto |
| 3,758,403 A | 9/1973 | Rosinski |
| 4,376,039 A | 3/1983 | Gladrow et al. |
| 4,472,518 A | 9/1984 | Chu |
| 4,503,023 A | 3/1985 | Breck et al. |
| 4,900,428 A | 2/1990 | Mester |
| 4,938,863 A | 7/1990 | Degnan et al. |
| 4,985,384 A | 1/1991 | Gilson |
| 5,079,202 A | 1/1992 | Kumar et al. |
| 5,110,776 A | 5/1992 | Chitnis et al. |
| 5,164,073 A | 11/1992 | Lam |
| 5,171,921 A | 12/1992 | Gaffney et al. |
| 5,236,880 A | 8/1993 | Chapman |
| 5,248,642 A | 9/1993 | Kumar et al. |
| 5,318,696 A | 6/1994 | Kowalski |
| 5,380,690 A | 1/1995 | Zhicheng et al. |
| 5,472,594 A | 12/1995 | Tsang et al. |
| 5,535,817 A | 7/1996 | Dunne |
| 5,646,082 A | 7/1997 | Tan-no et al. |
| 5,997,728 A | 12/1999 | Adewuyi et al. |
| 6,080,303 A | 6/2000 | Cao et al. |
| 6,222,087 B1 | 4/2001 | Johnson et al. |
| 6,307,117 B1 | 10/2001 | Tsunoda et al. |
| 6,566,293 B1 | 5/2003 | Vogt et al. |
| 6,787,123 B2 | 9/2004 | Du et al. |
| 7,514,385 B2 | 4/2009 | Du et al. |
| 2002/0003103 A1 | 1/2002 | Henry et al. |
| 2002/0049133 A1 | 4/2002 | Ziebarth et al. |
| 2003/0064881 A1 | 4/2003 | Du et al. |
| 2004/0167013 A1 | 8/2004 | Ou et al. |
| 2004/0266608 A1 | 12/2004 | Long et al. |
| 2005/0020867 A1 | 1/2005 | Xie et al. |

FOREIGN PATENT DOCUMENTS

| | | |
|---|---|---|
| CN | 1049406 A | 2/1991 |
| CN | 1052290 A | 6/1991 |
| CN | 1058382 A | 2/1992 |
| CN | 1093101 A | 10/1994 |
| CN | 1034223 | 3/1997 |
| CN | 1147420 | 4/1997 |
| CN | 1037327 | 2/1998 |
| CN | 1194181 A | 9/1998 |
| CN | 1121903 | 12/2002 |
| CN | 1465527 A | 1/2004 |

(Continued)

OTHER PUBLICATIONS

International Search Report, mailed Apr. 6, 2005.

(Continued)

*Primary Examiner* — Renee E Robinson
(74) *Attorney, Agent, or Firm* — Dickstein Shapiro LLP

(57) ABSTRACT

The invention discloses a catalyst and a method for cracking hydrocarbons. The catalyst comprises, calculated by dry basis, 10~65 wt % ZSM-5 zeolite, 0~60 wt % clay, 15~60 wt % inorganic oxide binder, 0.5~15 wt % one or more metal additives selected from the metals of Group VIIIB and 2~25 wt % P additive, in which the metal additive is calculated by metal oxide and the P additive is calculated by $P_2O_5$. The method for cracking hydrocarbons using this catalyst increases the yield of FCC liquefied petroleum gas (LPG) and the octane number of FCC gasoline, as well as it increases the concentration of propylene in LPG dramatically.

14 Claims, 5 Drawing Sheets

(56) References Cited

FOREIGN PATENT DOCUMENTS

| CN | 1493656 A | 5/2004 |
| CN | 1162327 | 8/2004 |
| EP | 0 496 226 A1 | 7/1992 |
| RU | 2235590 C1 | 9/2004 |
| WO | WO-2005/097950 A1 | 10/2005 |

OTHER PUBLICATIONS

J.M. Thomas, W.J. Thomas: "Principles and Practice of Heterogeneous Catalysis" © VCH Verlagsgesellschaft mbH; Chapter 3.7.5 Electron Microscopy, 1997, pp. 213-214.

a: Example 1; b: Comparative Example 5; c: Comparative Example 1; d: Comparative Example 2 e: Example 2; f: Example 3; g: Example 4; h: Example 5 i: Example 8; j: Example 9; k: Example 10; l: Example 11 m: Example 12; n: Example 13; o: Example 14; p: Example 15 q: Example 16; r: Example 17; s: Example 18; t: Example 19

CATALYST AND A METHOD FOR CRACKING HYDROCARBONS

CROSS-REFERENCE TO RELATED APPLICATIONS

This is a division of application Ser. No. 12/813,110, filed Jun. 10, 2010, which was a continuation of application Ser. No. 11/813,056, filed Dec. 28, 2005, the contents of both of which are incorporated herein by reference.

TECHNICAL FIELD

The present invention relates to a catalyst and a method for cracking hydrocarbons. More particularly, the present invention relates to a catalyst and a method for cracking hydrocarbons used to increase the concentration of propylene in FCC liquefied petroleum gas (LPG).

TECHNICAL BACKGROUND

Propylene is an important organic chemical raw material. With the rapid increase of the demand for the derivatives such as polypropylene, the requirement for propylene in the whole world is increased rapidly year by year. Fluid catalytic cracking is one of the most important technologies to produce light olefins and propylene. As for most of the FCC apparatus, using the catalyst or the addition agent containing zeolite with MFI structure is an effective technology in order to increase light olefins and propylene.

U.S. Pat. No. 3,758,403 disclosed earlier that the method by adding ZSM-5 zeolite in the FCC catalyst might increase the octane number of gasoline and the yield of $C_3$~$C_4$ olefins. For instance, when adding 1.5, 2.5, 5 and 10% ZSM-5 zeolite to the conventional catalyst with 10% REY molecular sieve, the octane number of gasoline is increased and the yield of low-carbon olefin is increased. The same result could be obtained by using the addition agent with ZSM-5 zeolite.

U.S. Pat. No. 5,318,696 disclosed a hydrocarbon conversion technology based on a catalyst which is consisted of a macroporous zeolite and a zeolite with MFI structure and a Si/Al ratio of lower than 30. This technology is used to produce gasoline with high octane number by employing improved FCC process and increase low-carbon olefins, especially propylene.

U.S. Pat. No. 5,997,728 disclosed a method in which a shape-selective cracking addition agent is used in large amount in the FCC process of heavy feedstock. The addition agent comprises the amorphous matrix by adding 12~40% ZSM-5 zeolite, and its inventory in the system is at least 10%, which makes the content of ZSM-5 zeolite in the catalyst higher than 3%. This method increases low-carbon olefins in a large scale, at the same time it doesn't increase the yield of aromatic extraly and lose the yield of gasoline.

The cracking activity and hydrothermal stability of ZSM-5 zeolite is increased and the use level of zeolite can be reduced after the modification of ZSM-5 zeolite by phosphorus compounds.

CN1049406C disclosed a zeolite with MFI structure which containing P and rare earth. The anhydrous chemical expression is $aRE_2O_3 \cdot bNa_2O \cdot Al_2O_3 \cdot cP_2O_5 \cdot dSiO_2$, in which a=0.01~0.25, b=0.005~0.02, c=0.2~1.0 and d=35~120. This zeolite displays excellent hydrothermal stability and good selectivity of low-carbon olefins when used in the conversion of hydrocarbons at high temperature.

CN1034223C disclosed a cracking catalyst used to produce low-carbon olefins, which is consisted of 0~70% clay (based on weight of catalyst), 5~99% inorganic oxide and 1~50% zeolite. The zeolite is the mixture of 0~25 wt % REY or high silica Y zeolite and 75~100 wt % five membered ring high silica zeolite containing P and rare earth. The catalyst has higher hydrothermal activity and stability, conversion and yield of $C_2^=$~$C_4^=$ than the catalyst using conventional ZSM-5 zeolite as active component.

U.S. Pat. No. 5,110,776 disclosed the preparation of ZSM-5 zeolite catalyst modified with P, in which the modification procedure with P is proceeded by dispersing the zeolite into a solution of P compounds at a pH value of 2~6, mixing with matrix and spray-drying. The obtained catalyst increases the octane number of gasoline, and at the same time it doesn't increase the yield of dry gas and coke.

U.S. Pat. No. 6,566,293 disclosed a cracking catalyst comprising P modified ZSM-5 zeolite. The preparation of P modified ZSM-5 zeolite is proceeded by dispersing the zeolite into a solution of P compounds at a pH value of higher than 4.5, in which the loading content of P (calculated by $P_2O_5$) is at least 10 wt %, then mixing with matrix and other zeolite components and spray-drying. The obtained catalyst has high yield of low-carbon olefins.

U.S. Pat. No. 5,171,921 disclosed a ZSM-5 zeolite modified by P. The Si/Al ratio of the zeolite is 20~60. After the immersion with P compounds and steam-aging treatment at 500~700° C., the zeolite displays higher activity than the zeolite without P modification when used in the conversion of $C_3$~$C_{20}$ hydrocarbons to $C_2$~$C_5$ olefins.

U.S. Pat. No. 6,080,303 disclosed a method used to increase the catalytic activity of microporous and mesoporous zeolites, in which microporous and mesoporous zeolites are treated with P compounds firstly and then combined with $AlPO_4$ gel. This method may improve the activity and hydrothermal stability of microporous and mesoporous zeolites.

U.S. Pat. No. 5,472,594 disclosed a hydrocarbon conversion technology based on a catalyst which comprises a macroporous zeolite and a P modified mesoporous zeolite with MFI structure. This technology is used to produce gasoline with high octane number by employing improved FCC process and increase low-carbon olefins, especially $C_4/C_5$.

Besides the P modification of ZSM-5 zeolite, the selectivity of the catalyst and addition agent for low-carbon olefins also could be improved by the introduction of P compounds to matrix.

USP2002/0003103A1 disclosed a FCC technology employed to increase the yield of propylene, in which at least part of the gasoline products are piped into the second riser reactor and cracked again. Besides macroporous zeolite such as USY, the catalyst composition used comprises mesoporous zeolite such as ZSM-5 and inorganic binder possessing cracking activity. The inorganic binder component contains P and the P/Al ratio is 0.1~10. This technology may increase low-carbon olefins in a large scale, especially the yield of propylene.

USP2002/0049133A1 disclosed a catalyst with high zeolite content and high attrition strength. The catalyst comprises 30~85 wt % ZSM-5 zeolite, 6~24 wt % P (calculated by $P_2O_5$), <10 wt % $Al_2O_3$ and the remainder clay, in which P exists in matrix. When used in FCC process, the catalyst can increase light olefins, especially the yield of propylene.

The method of modifying zeolite with metal and its application were reported in following patents. For instance, U.S. Pat. No. 5,236,880 disclosed a catalyst containing the zeolites with MFI or MEL structures, in which the zeolite is modified by the metal of Group VIII, preferred by Ni. After the introduction of Ni, the zeolite is treated at a controlled temperature under thermal or hydrothermal conditions, which leads to the enrichment of the metal of Group VIII and Al on the surface. When used in the conversion of hydrocarbons, the catalyst may increase the octane number of gasoline and the yield of $C_3$~$C_4$ olefins.

CN1057408A disclosed a cracking catalyst containing high Si zeolite and high cracking activity, in which the high Si zeolite is ZSM-5 zeolite, β zeolite or MOR zeolite containing 0.01~3.0 wt % P, 0.01~1.0 wt % Fe or 0.01~10 wt % Al. The high Si zeolite is obtained by heating H- or K-ZSM-5 zeolite, β zeolite or MOR zeolite with a Si/Al ratio of higher than 15 to 350~820° C. and passing it into an aqueous solution of Al halide, Fe halide or ammonium phosphate at a volume hourly space velocity of 0.1~10 $h^{-1}$.

CN1465527A disclosed a MFI zeolite with P and transition metal. The anhydrous chemical expression of the zeolite, calculated by mass of oxide, is (0~0.3) $Na_2O$.(0.5~5) $Al_2O_3$.(1.3~10) $P_2O_5$.(0.7~15) $M_2O_3$.(70~97) $SiO_2$, in which M is selected from one of the transition metals Fe, Co and Ni. When used in the FCC procedure of petroleum hydrocarbon, the zeolite may increase the yield and selectivity for $C_2$~$C_4$ olefins and result in higher yield of LPG.

At present for most of the FCC apparatus, increasing the concentration of propylene in LPG is an important way to increase the economic benefits for FCC apparatus at the same yield of LPG. Although the zeolite materials and catalysts disclosed in the prior art could effectively increase the yield of low-carbon olefins and the octane number of FCC gasoline products when used in FCC process, during the FCC reaction they give out relative low selectivity for propylene, so the scope for increasing propylene concentration in LPG is limited.

DISCLOSURE OF THE INVENTION

The object of the invention is to provide a new catalyst on the basis of the prior art and a method for cracking hydrocarbons by using this catalyst.

The inventor have found that the catalyst, prepared by using the modified MFI zeolite containing P and transition metal as disclosed in CN1465527A as active component, and introducing a proper content of transition metal additive and P additive further, could increase not only the yield of LPG in FCC effectively and the octane number of FCC gasoline, but also increase the concentration of propylene in LPG of FCC dramatically when used in the method for cracking hydrocarbons.

Therefore the catalyst supplied by this invention is characterized by that the catalyst comprises, calculated by dry basis, 10~65 wt % ZSM-5 zeolite, 0~60 wt % clay, 15~60 wt % inorganic oxide binder, 0.5~15 wt % one or more metal additives selected from the metals of Group VIIIB and 2~25 wt % P additive, in which the metal additive and the P additive are both calculated by oxide.

The catalyst supplied by this invention is preferably consisted of, calculated by dry basis, 20~50 wt % ZSM-5 zeolite, 10~45 wt % clay, 25~50 wt % inorganic oxide binder, 1.0~10 wt % one or more metal additives selected from the metals of Group VIIIB and 5~15 wt % P additive. In which the ZSM-5 zeolite is preferably a ZSM-5 zeolite modified by P and one of the metals selected from Fe, Co and Ni. The anhydrous chemical expression, calculated by oxide, is (0~0.3) $Na_2O$.(0.5~5)$Al_2O_3$.(1.3~10)$P_2O_5$.(0.7~15)$M_xO_y$.(70~97)$SiO_2$, in which x is the atom number of M and y is a number needed to satisfy the oxidation state of M. In preferred condition, the modified ZSM-5 zeolite is modified by P and Fe, and the anhydrous chemical expression, calculated by oxide, is (0~0.2) $Na_2O$.(0.9~3.5) $Al_2O_3$.(1.5~7) $P_2O_5$.(0.9~10) $M_xO_y$.(82~92)$SiO_2$.

In the catalyst supplied by this invention, the contents of metal additive of Group VIIIB and P additive do not include the contents of transition metal and P in the modified ZSM-5 zeolite.

In the catalyst supplied by this invention, under preferred condition, the metal of Group VIIIB is selected from one or more of Fe, Co and Ni, more preferably Fe. When using Fe as additive, the XRD patterns of the catalyst comprises at least the characteristic diffraction peaks of FePO species at 2θ=16.35±0.5°, 2θ=26.12±0.5° and 2θ=30.94±0.5°.

In the catalyst supplied by this invention, the clay is well known for the technicians in the art and there is no special limitation to it in this invention. It could be selected from one or mixture of more than one of kaolin, metakaolin, sepiolite, attapulgite clay, montmorillonite, rectorite, diatomite, halloysite, steatite, bentonite, hydrotalcites, preferably from one or mixture of more than one of kaolin, metakaolinm, diatomite, sepiolite, attapulgite clay, montmorillonite and rectorite.

The inorganic oxide binder is selected from one or more of the inorganic oxides used as matrix and binder component of catalyst, which are well known for the technicians in the art and there is no special limitation to it in this invention. It is selected from one or mixture of more than one of pseudoboehmite, alumina sol, silica-alumina sol, water glass and phosphorus-alumina sol, preferably from one or mixture of more than one of pseudoboehmite, alumina sol and phosphorus-alumina sol. When the addition agent has phosphorus-alumina sol, the content of P in the phosphorus-alumina sol, calculated by $P_2O_5$, is added into the content of P additive.

The catalyst supplied by this invention could be prepared from zeolite, clay and inorganic oxide binder through any methods disclosed in the existing, preparation technologies of cracking catalyst such as spray-drying process, and there is no special limitation in this invention.

The transition metal additives of Group VIIIB exist in the form of their oxide, phosphate, phosphite, basic phosphate, acid phosphate.

One or more of the inorganic compounds and organic compounds of the transition metal could be easy to dissolve in water, or hard to dissolve or insoluble in water. The examples of the transition metal compounds include their oxide, hydroxide, chloride, nitrate, sulphate, phosphate and their organic compounds, etc. The preferred transition metal compounds are selected from one or more of their chloride, nitrate, sulphate and phosphate.

The transition metal additive of Group VIIIB is preferably introduced by adding transition metal compounds to the slurry in any step before spray-drying in the preparation process of the catalyst. It also can be introduced after spray-drying through immersion or chemical adsorption of transition metal compounds and calcination process, including to immerse the catalyst with a aqueous solution of transition metal compounds or to treat it by chemical adsorption method, then to separate the solid and the liquid (if needed), and to dry and calcine. The drying temperature is from room temperature to 400° C., preferred 100~300° C. The calcination temperature is 400~700° C., preferred 450~650° C. The calcination time is 0.5~100 h, preferred 0.5~10 h.

So the transition metal additive may exist in any possible positions of the catalyst, such as the internal channel of the zeolite, the surface of the zeolite, the matrix, or exist in the internal channel of the zeolite, the surface of the zeolite and the matrix simultaneously, preferred in be matrix.

In the catalyst supplied by this invention, the P additive exists in the form of phosphorus compounds (such as the oxide of phosphorus, phosphate, phosphite, basic phosphate and acid phosphate). The P additive can be introduced into the catalyst by one of the following methods or the combination of the following methods, but not limited to these methods:

1. Adding phosphorus compounds to the slurry before spray-drying process;
2. Introduced into the catalyst by the inorganic oxide binder. For instance, when the inorganic oxide binder containing phosphorus-alumina sol, after the catalyst is calcined, P is introduced into the catalyst. The phosphorus-alumina sol could also be used as matrix and binder, so this part of P also belongs to the P additive supplied by this invention.
3. Introduced into the catalyst after spray-drying process through immersion or chemical adsorption of phosphorus compounds, solid-liquid separation (if needed), drying and calcination process. The drying temperature is from room temperature to 400° C., preferred 100~300° C. The calcination temperature is 400~700° C., preferred 450~650° C. The calcination time is 0.5~100 h, preferred 0.5~10 h.

So the P additive may exist in any possible positions of the catalyst, such as the internal channel of the zeolite, the surface of the zeolite, in the matrix, or exist in the internal channel of the zeolite, the surface of the zeolite and the matrix simultaneously.

In the preparation method of the catalyst supplied by this invention, the phosphorus compounds are selected from one or more of the inorganic compounds and organic compounds of phosphorus. The phosphorus compounds could be easy to dissolve in water, or hard to dissolve or insoluble in water. The examples of the phosphorus compounds include the oxide of phosphorus, phosphoric acid, phosphate, phosphite, hypophosphite and organic compounds of phosphorus. The preferred phosphorus compounds are selected from one or more of $H_3PO_4$, $(NH_4)_3PO_4$, $(NH_4)H_2PO_4$, $(NH_4)_2HPO_4$, $AlPO_4$ and phosphorus-alumina sol.

A method for cracking hydrocarbons using above catalysts is also applied in this invention, in which hydrocarbons are contacted with a mixture of catalysts mentioned above under cracking condition, and then the cracked products are collected.

In the cracking method supplied by this invention, the contact of the hydrocarbons and the mixture of catalysts could be proceeded in all kinds of reactors. The reactor could be a riser reactor, a fixed-bed reactor, a fluidized-bed reactor or a moving-bed reactor, preferably the reactor is the riser reactor.

The contact conditions include a contact temperature of 400~650° C., preferred 420~600° C., and a catalyst-to-oil ratio (the weight ratio of catalyst to hydrocarbon) of 1~25, preferred 3~20.

As for a fixed-bed reactor, a fluidized-bed reactor or a moving-bed reactor, the contact condition also includes the weight hourly space velocity of 10~120 $h^{-1}$, preferred 15~80 $h^{-1}$. But for a riser reactor the contact condition further includes the reaction time of 0.5~15 s, preferably 0.5~10 s.

In the cracking method supplied by this invention, the mixture of catalysts containing the catalysts mentioned above are consisted mainly of a main cracking catalyst and the catalyst mentioned above and the content of them is well known for the technicians in the art. In general, in the mixture of catalysts the content of the main cracking catalyst is 70~99 wt %, preferred 80~95 wt %, and the content of the catalyst supplied by this invention is 1~30 wt %, preferably 3~20 wt %.

In the catalyst mixture, the type and the composition of the main cracking catalyst is well known for the technicians in this area, which may be all kinds of cracking catalysts, such as all kinds of cracking catalyst containing zeolite.

In the cracking method supplied by this invention, the hydrocarbons are selected from one or more of all kinds of petroleum cuts, such as crude oil, atmospheric residuum, vacuumed residuum, atmospheric gas oil, vacuumed gas oil, straight run gas oil, propane deasphalted oil, coking gas oil and liquefied products of coal. The hydrocarbons may have heavy metal impurities such as Ni and V, and impurities of S and N, in which the content of S can reach 3.0 wt %, the content of N can be up to 2.0 wt %, the content of metal impurities such as V and Ni can be as high as 3000 ppm.

In the cracking method supplied by this invention, the mixture of catalysts could be used one time, but in a preferred situation the mixture of catalysts are regenerated and used cyclically. The regeneration of the catalyst mixture is a process that the coke in the catalyst mixture is calcined under oxygen atmosphere which in general is air, as is well known for the technicians in the art. For instance, generally the regeneration temperature is 600~770° C., preferred 650~730° C. When the contact procedure of the hydrocarbons and the catalyst mixture is proceeded on a fixed-bed reactor, a fluidized-bed reactor or a moving-bed reactor, the regeneration could be finished by piping oxygen-containing atmosphere in situ. When the contact procedure of the hydrocarbons and the catalyst mixture is proceeded on a riser reactor, the regeneration could be finished by using the existing reaction-regeneration system. The existing reaction-regeneration system and the regenerator of FCC are summarized at pages 282-338 in <<The processing technique of residuum>> (Li Chunnian, Sinopec. Publishing company, 2002).

The catalyst supplied by this invention by adding a proper content of the transition metal additive of Group VIIIB and the P additive, especially the samples using modified ZSM-5 zeolite as active component simultaneously, may increase the selectivity for propylene in FCC process, and consequently increase the concentration of propylene in LPG of FCC dramatically. For instance, the content of propylene in the products is increased by 0.76~4.05% (Tables 3, 4, 5), the concentration of propylene in LPG is increased to higher than 35.70 wt %.

EXAMPLES

Figure 1:
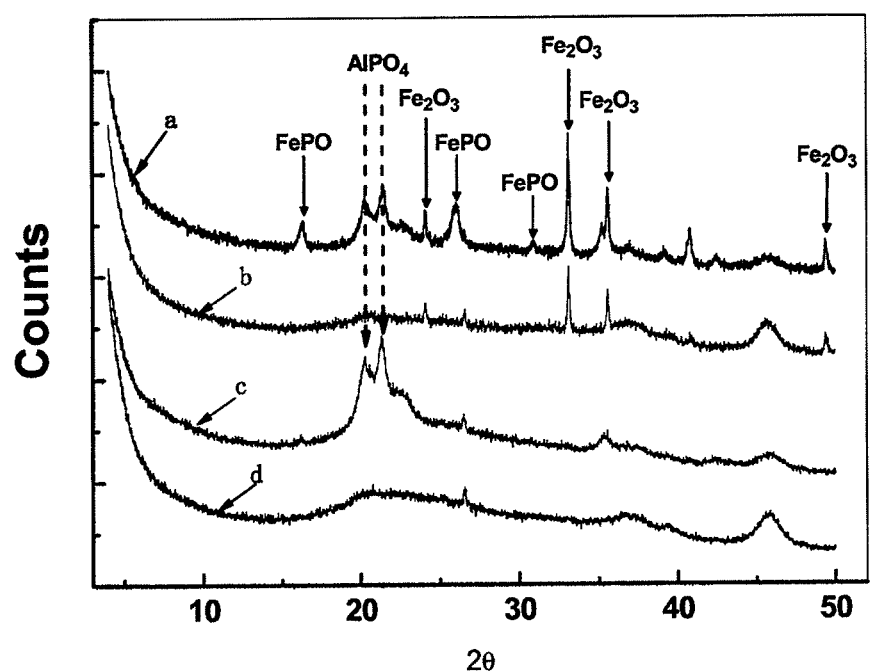
FIG. 1~FIG. 5 are the XRD patterns for the catalysts and the comparative catalysts prepared by the examples and the comparative examples.

The following examples are used to explain the invention, which is not a limitation to the invention.

In the examples and comparative examples, the eight modified ZSM-5 samples $A_1$~$A_8$ are prepared according to the method disclosed in CN1465527A. The anhydrous chemical expressions are obtained on the basis of the chemical composition of the zeolite measured by X-ray fluoroscopy.

Sample $A_1$: $0.04Na_2O.3.57Al_2O_3.4.0P_2O_5.2.4Fe_2O_3.90.49SiO_2$.

Sample $A_2$: $0.1Na_2O.5.0Al_2O_3.2.0P_2O_5.0.9Fe_2O_3.92SiO_2$.

Sample $A_3$: $0.1Na_2O.5.3Al_2O_3.1.5P_2O_5.1.1Fe_2O_3.92SiO_2$.

Sample $A_4$: $0.03Na_2O.2.2Al_2O_3.4.9P_2O_5.2.1Fe_2O_3.90.8SiO_2$.

Sample $A_5$: $0.1Na_2O.0.94Al_2O_3.5.1P_2O_5.10.1Fe_2O_3.84SiO_2$.

Sample A$_6$:
0.03Na$_2$O.5.1Al$_2$O$_3$.4.8P$_2$O$_5$.3.6Co$_2$O$_3$.86.5SiO$_2$.
Sample A$_7$:
0.1Na$_2$O.4.6Al$_2$O$_3$.6.9P$_2$O$_5$.6.4Ni$_2$O$_3$.82SiO$_2$.
Sample A$_8$:
0.1Na$_2$O.5.2Al$_2$O$_3$.4.5P$_2$O$_5$.2.0Ni$_2$O$_3$.88.2SiO$_2$.

Pseudoboehmite is an industry product of Shandong Alumina Company with a solid content of 60 wt %. Alumina sol is an industry product of Qilu Catalyst Factory with an Al$_2$O$_3$ content of 21.5 wt %. Water glass is an industry product of Qilu Catalyst Factory with a SiO$_2$ content of 28.9 wt % and a Na$_2$O content of 8.9 wt %. Kaolin is a kind of special kaolin for cracking catalyst manufactured by Suzhou kaolin Company with a solid content of 78 wt %. ZRP-5 zeolite is an industry product with conventional MFI structure manufactured by Qilu Catalyst Factory with a P$_2$O$_5$ content of 2.5 wt % and a crystallinity of 85 wt % as well as a Si/Al ratio of 50.

In the examples and comparative examples, the characterization method of the XRD patterns for the catalyst samples is:

The XRD patterns were characterized on a D/MAX-IIIA X-Ray Diffractometer (from Rigaku) at 40 kV and 40 mA using Cu Kα radiation and Ni filter. The sample scans were collected at scan step of 0.02°, step time of 1 s and diffraction slit of 2 mm/2 mm/0.2 mm.

Examples 1~19 are used to explain the preparation of catalyst employed in the method supplied by this invention.

Example 1

The preparation of phosphorus-alumina sol: 1.05 kg pseudoboehmite (dry basis) and 3.35 kg deionized water was mixed together and stirred for 30 min, then 4.9 kg concentrated H$_3$PO$_4$ (chemical pure, 85 wt % of H$_3$PO$_4$) was added into the slurry under stirring. The obtained slurry was heated to 70° C. and reacted for 45 min at this temperature to form the colorless and transparent phosphorus-alumina sol with a P$_2$O$_5$ content of 30.6 wt % and an Al$_2$O$_3$ content of 10.5 wt % as well as pH=1.7.

1.75 kg A$_1$ (dry basis), 1.4 kg kaolin (dry basis), 0.65 kg pseudoboehmite (dry basis), 6.2 kg deionized water and 2.79 kg alumina sol were mixed together and stirred for 120 min, then 1 L aqueous FeCl$_3$.6H$_2$O solution (having 100 g Fe$_2$O$_3$) was added into the slurry under stirring. The pH value of the slurry is 3.0. After stirring for another 45 min, 1.22 kg phosphorus-alumina sol was added into the slurry and stirred evenly. Microspheres with average particle size of 65 μm were obtained by the spray-drying of the slurry at input temperature of 500° C. and exhaust (output) temperature of 180° C. The catalyst ZJ$_1$ with 35 wt % A$_1$, 28 wt % kaolin, 27.5 wt % Al$_2$O$_3$, 2.0 wt % Fe additive (calculated by Fe$_2$O$_3$) and 7.5 wt % P additive (calculated by P$_2$O$_5$) was obtained after the calcination of the microspheres at 500° C. for 1 h.

The XRD pattern of this catalyst is shown in FIG. 1 as line a, in which the diffraction peaks at 2θ=16.35°, 2θ=26.12° and 2θ=30.94° are the characteristic diffraction peaks of FePO species.

Example 2

1.84 kg A$_1$ (dry basis), 1.33 kg kaolin (dry basis), 0.98 kg pseudoboehmite (dry basis), 7.2 kg deionized water and 2.79 kg alumina sol were mixed together and stirred for 120 min, then 1 L aqueous FeCl$_3$.6H$_2$O solution (having 250 g Fe$_2$O$_3$) was added into the slurry under stirring. The pH value of the slurry is 3.0. The slurry was stirred for another 45 min. Then microspheres with average particle size of 65 μm were obtained by the spray-drying of the slurry at input temperature of 500° C. and exhaust (output) temperature of 180° C. The microspheres with 36.8 wt % A$_1$, 26.6 wt % kaolin, 31.6 wt % Al$_2$O$_3$ and 5.0 wt % Fe additive (calculated by Fe$_2$O$_3$) were obtained after calcination at 500° C. for 1 h.

1 kg microspheres obtained above (dry basis), 10 L deionized water and 100 g (NH$_4$)$_2$HPO$_4$ were mixed together. The obtained slurry was heated to 60° C. under stirring and reacted for 20 min at this temperature. The slurry was vacuum-filtrated and dried. The catalyst ZJ$_2$ with 35 wt % A$_1$, 25.3 wt % kaolin, 30 wt % Al$_2$O$_3$, 4.7 wt % Fe additive (calculated by Fe$_2$O$_3$) and 5 wt % P additive (calculated by P$_2$O$_5$) was obtained after calcination at 500° C. for 2 h.

Figure 2:
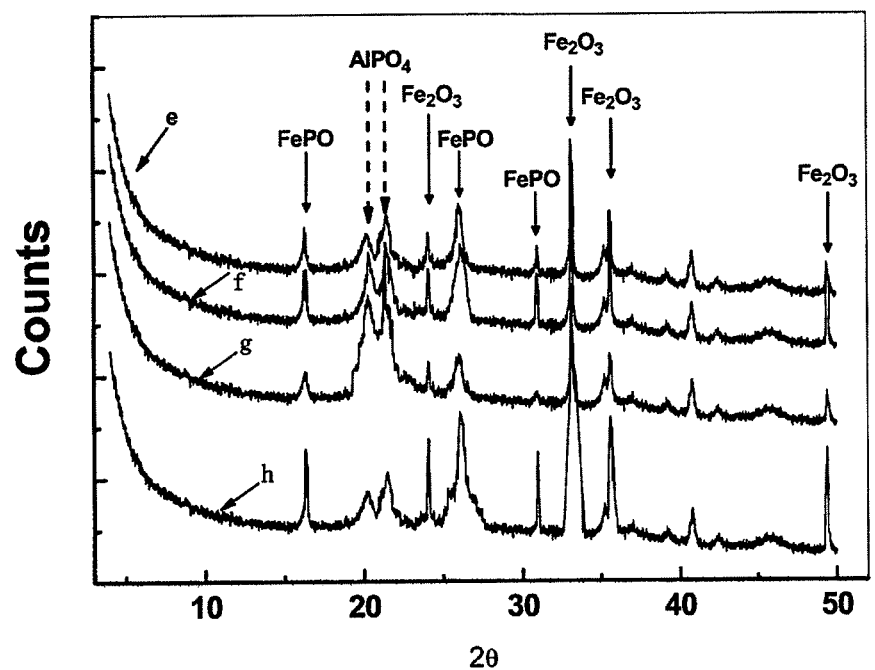

The XRD pattern of this catalyst is shown in FIG. 2 as line e, in which the diffraction peaks at 2θ=16.37°, 2θ=26.22° and 2θ=30.90° are the characteristic diffraction peaks of FePO species.

Example 3

1.94 kg A$_1$ (dry basis), 1.91 kg pseudoboehmite (dry basis), 7.2 kg deionized water and 2.79 kg alumina sol were mixed together and stirred for 120 min, then 1 L aqueous FeCl$_3$.6H$_2$O solution (having 550 g Fe$_2$O$_3$) was added into the slurry under stirring. The pH value of the slurry is 3.0. The slurry was stirred for another 45 min. Then microspheres with average particle size of 65 μm were obtained by the spray-drying of the slurry at input temperature of 500° C. and exhaust temperature of 180° C. The microspheres with 38.8 wt % A$_1$, 50.2 wt % Al$_2$O$_3$ and 11 wt % Fe additive (calculated by Fe$_2$O$_3$) were obtained after calcination at 500° C. for 1 h.

1 kg microspheres obtained above (dry basis), 10 L deionized water and 210 g (NH$_4$)$_2$HPO$_4$ were mixed together. The obtained slurry was heated to 60° C. under stirring and reacted for 20 min. The slurry was vacuum-filtrated and dried. The catalyst ZJ$_3$ with 35 wt % A$_1$, 45.1 wt % Al$_2$O$_3$, 9.9 wt % Fe additive (calculated by Fe$_2$O$_3$) and 10 wt % P additive (calculated by P$_2$O$_5$) was obtained after calcination at 500° C. for 2 h.

The XRD pattern of this catalyst is shown in FIG. 2 as line f, in which the diffraction peaks at 2θ=16.25°, 2θ=26.18° and 2θ=30.87° are the characteristic diffraction peaks of FePO species.

Example 4

The preparation method is as same as Example 1, but the difference is that the weight of kaolin is 1.25 kg (dry basis) and FeCl$_3$.6H$_2$O solution is replaced by 1 L Co(NO$_3$)$_2$.6H$_2$O solution (having 250 g CoO). The catalyst ZJ$_4$ was obtained with 35 wt % A$_1$, 25 wt % kaolin, 27.5 wt % Al$_2$O$_3$, 5 wt % Co additive (calculated by CoO) and 7.5 wt % P additive (calculated by P$_2$O$_5$).

Example 5

The preparation method is as same as Example 1, but the difference is that the weight of kaolin is 1.25 kg (dry basis) and FeCl$_3$.6H$_2$O solution is replaced by 1 L Ni(NO$_3$)$_2$.6H$_2$O solution (having 250 g NiO). The catalyst ZJ$_5$ was obtained with 35 wt % A$_1$, 25 wt % kaolin, 27.5 wt % Al$_2$O$_3$, 5 wt % Ni additive (calculated by NiO) and 7.5 wt % P additive (calculated by P$_2$O$_4$) that doesn't include the P component of the modified MFI zeolite.

Example 6

1 kg catalyst ZJ$_1$ (dry basis), 10 L deionized water and 157 g (NH$_4$)$_2$HPO$_4$ were heated to 60° C. or under stirring and reacted for 20 min at this temperature. The slurry was vacuum-filtered and dried. The catalyst $ZJ_6$ with 32.38 wt % $A_1$, 25.9 wt % kaolin, 25.4 wt % $Al_2O_3$, 1.85 wt % Fe additive (calculated by $Fe_2O_3$) and 14.47 wt % P additive (calculated by $P_2O_5$) was obtained after calcination at 500° C. for 2 h.

The XRD pattern of this catalyst is shown in FIG. 2 as line g, in which the diffraction peaks at 2θ=16.42°, 2θ=26.08° and 2θ=30.97° are the characteristic diffraction peaks of FePO species.

Example 7

1.75 kg $A_1$ (dry basis), 1 kg kaolin (dry basis), 3.46 kg water glass and 5 kg deionized water were mixed together and stirred for 120 min, then 1 L aqueous $FeCl_3 \cdot 6H_2O$ solution (having 750 g $Fe_2O_3$) was added into the slurry under stirring. The pH value of the slurry is 3.0. After stirring for another 45 min, 1.22 kg phosphorus-alumina sol was added into the slurry and stirred evenly. Microspheres with average particle size of 65 μm were obtained by the spray-drying of the slurry at input temperature of 500° C. and exhaust (output) temperature of 180° C. Then the microspheres were calcined at 400° C. for 1 h.

1 kg the above calcined microspheres (dry basis), 10 L deionized water and 100 g $NH_4Cl$ were heated to 60° C. under stirring, washed for 20 min at this temperature and vacuum-filtered. The filter cake was washed again according to the above method and dried at 120° C. The catalyst $ZJ_7$ was obtained with 35 wt % $A_1$, 20 wt % kaolin, 2.5 wt % $Al_2O_3$, 20 wt % $SiO_2$, 15 wt % Fe additive (calculated by $Fe_2O_3$) and 7.5 wt % P additive (calculated by $P_2O_5$).

The XRD pattern of this catalyst is shown in FIG. 2 as line h, in which the diffraction peaks at 2θ=16.35°, 2θ=26.07° and 2θ=30.88° are the characteristic diffraction peaks of FePO species.

Example 8

The catalyst was prepared according to the method of Example 1, but the difference is that the weight of $A_1$ is 2.25 kg (dry basis) and the weight of kaolin is 0.9 kg (dry basis). The catalyst $ZJ_8$ was obtained with 45 wt % $A_1$, 18 wt % kaolin, 27.5 wt % $Al_2O_3$, 2 wt % Fe additive (calculated by $Fe_2O_3$) and 7.5 wt % P additive (calculated by $P_2O_5$).

Figure 3:
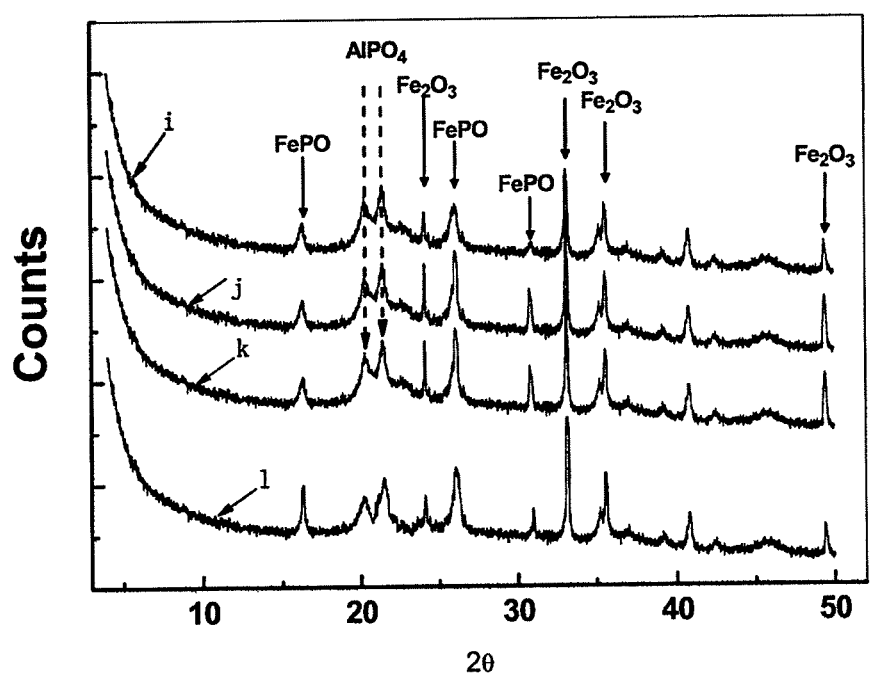

The XRD pattern of this catalyst is shown in FIG. 3 as line i, in which the diffraction peaks at 2θ=16.38°, 2θ=26.20° and 2θ=30.91° are the characteristic diffraction peaks of FePO species.

Example 9

1 kg $A_1$ (dry basis), 1.85 kg kaolin (dry basis), 0.9 kg pseudoboehmite (dry basis), 7.2 kg deionized water and 2.79 kg alumina sol were mixed together and stirred for 120 min, then 1 L aqueous $FeCl_3 \cdot 6H_2O$ solution (having 400 g $Fe_2O_3$) was added into the slurry under stirring. The pH value of the slurry is 3.0 adjusted by the dosage of HCl. After stirring for another 30 min, 465 g $(NH_4)_2HPO_4$ was added into the slurry and stirred for 30 min. Microspheres with average particle size of 65 μm were obtained by the spray-drying of the slurry at input temperature of 500° C. and exhaust temperature of 180° C. The catalyst $ZJ_9$ with 20 wt % $A_1$, 37 wt % kaolin, 30 wt % $Al_2O_3$, 8 wt % Fe additive (calculated by $Fe_2O_3$) and 5 wt % P additive (calculated by $P_2O_5$) was obtained after the calcination of the microspheres at 500° C. for 1 h.

The XRD pattern of this catalyst is shown in FIG. 3 as line j, in which the diffraction peaks at 2θ=16.35°, 2θ=26.07° and 2θ=30.82° are the characteristic diffraction peaks of FePO species.

Example 10

The catalyst was prepared according to the method of Example 9, but the difference is that $A_1$ is replaced by $A_2$ with same weight. The catalyst $ZJ_{10}$ was obtained with 20 wt % $A_2$, 37 wt % kaolin, 30 wt % $Al_2O_3$, 8 wt % Fe additive (calculated by $Fe_2O_3$) and 5 wt % P additive (calculated by $P_2O_5$).

The XRD pattern of this catalyst is shown in FIG. 3 as line k, in which the diffraction peaks at 2θ=16.32°, 2θ=25.97° and 2θ=30.90° are the characteristic diffraction peaks of FePO species.

Example 11

1.25 kg $A_3$ (dry basis), 1 kg kaolin (dry basis), 1.65 kg pseudoboehmite (dry basis), 7.2 kg deionized water and 2.79 kg alumina sol were mixed together and stirred for 120 min, then 1 L aqueous $FeCl_3 \cdot 6H_2O$ solution (having 250 g $Fe_2O_3$) was added into the slurry under stirring. The pH value of the slurry is 3.0 adjusted by the dosage of HCl. After stirring for another 30 min, 465 g $(NH_4)_2HPO_4$ was added into the slurry and stirred for 30 min. Microspheres with average particle size of 65 μm were obtained by the spray-drying of the slurry at input temperature of 500° C. and exhaust (output) temperature of 180° C. The catalyst $ZJ_{11}$ with 25 wt % $A_3$, 20 wt % kaolin, 45 wt % $Al_2O_3$, 5 wt % Fe additive (calculated by $Fe_2O_3$) and 5 wt % P additive (calculated by $P_2O_5$) was obtained after the calcination of the microspheres at 500° C. for 1 h.

The XRD pattern of this catalyst is shown in FIG. 3 as line l, in which the diffraction peaks at 2θ=16.31°, 2θ=26.06° and 2θ=30.92° are the characteristic diffraction peaks of FePO species.

Example 12

2 kg $A_4$ (dry basis), 0.75 kg kaolin (dry basis), 1.15 kg pseudoboehmite (dry basis), 7.2 kg deionized water and 2.79 kg alumina sol were mixed together and stirred for 120 min, then 1 L aqueous $FeCl_3 \cdot 6H_2O$ solution (having 250 g $Fe_2O_3$) was added into the slurry under stirring. The pH value of the slurry is 3.0 adjusted by the dosage of HCl. After stirring for another 30 min, 465 g $(NH_4)_2HPO_4$ was added into the slurry and stirred for 30 min. Microspheres with average particle size of 65 μm were obtained by the spray-drying of the slurry at input temperature of 500° C. and exhaust temperature of 180° C. The catalyst $ZJ_{12}$ with 40 wt % $A_4$, 15 wt % kaolin, 35 wt % $Al_2O_3$, 5 wt % Fe additive (calculated by $Fe_2O_3$) and 5 wt % P additive (calculated by $P_2O_5$) was obtained after the calcination of the microspheres at 500° C. for 1 h.

Figure 4:
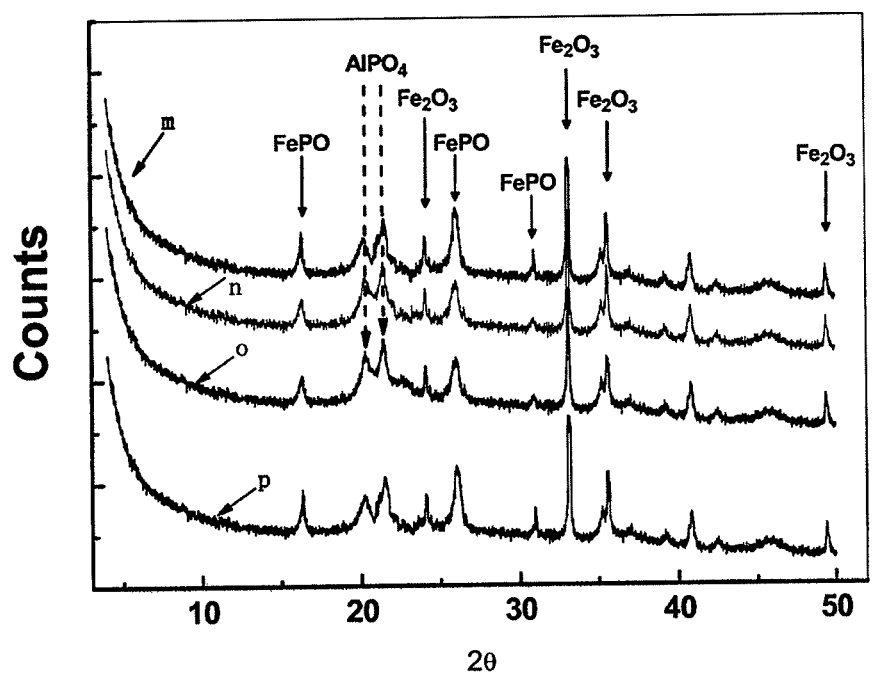

The XRD pattern of this catalyst is shown in FIG. 4 as line m, in which the diffraction peaks at 2θ=16.38°, 2θ=26.02° and 2θ=30.91° are the characteristic diffraction peaks of FePO species.

Example 13

2.89 kg $A_5$ (dry basis), 1.4 kg pseudoboehmite (dry basis), 7.2 kg deionized water and 2.79 kg alumina sol were mixed together and stirred for 120 min, then 1 L aqueous $FeCl_3 \cdot 6H_2O$ solution (containing 105.5 g $Fe_2O_3$) was added into the slurry under stirring. The pH value of the slurry is 3.0.

The slurry was stirred for another 45 min. Then microspheres with average particle size of 65 μm were obtained by the spray-drying of the slurry at input temperature of 500° C. and exhaust temperature of 180° C. The microspheres with 57.89 wt % $A_8$, 40 wt % $Al_2O_3$ and 2.11 wt % Fe additive (calculated by $Fe_2O_3$) were obtained after calcination at 500° C. for 1 h.

1 kg microspheres obtained above (dry basis), 10 L deionized water and 21.0 g $(NH_4)_2HPO_4$ were heated to 60° C. under stirring and reacted for 20 min at this temperature. The slurry was vacuum-filtrated and dried. The catalyst $ZJ_{13}$ with 55 wt % $A_5$, 38 wt % $Al_2O_3$, 2 wt % Fe additive (calculated by $Fe_2O_3$) and 5 wt % P additive (calculated by $P_2O_5$) was obtained after calcination at 500° C. for 2 h The XRD pattern of this catalyst is shown in FIG. 4 as line n, in which the diffraction peaks at 2θ=16.31°, 2θ=26.09° and 2θ=30.80° are the characteristic diffraction peaks of FePO species.

Example 14

1.5 kg $A_6$ (dry basis), 1.5 kg kaolin (dry basis), 0.9 kg pseudoboehmite (dry basis), 6.2 kg deionized water and 2.79 kg alumina sol were mixed together and stirred for 120 min, then 1 L aqueous $FeCl_3.6H_2O$ solution (containing 125 g $Fe_2O_3$) was added into the slurry under stirring. The pH value of the slurry is 3.0. After stirring for another 45 min, 1.22 kg phosphorus-alumina sol was added into the slurry and stirred evenly. Microspheres with average particle size of 65 μm were obtained by the spray-drying of the slurry at input temperature of 500° C. and exhaust temperature of 180° C. The catalyst $ZJ_{14}$ with 30 wt % $A_6$, 30 wt % kaolin, 30 wt % $Al_2O_3$, 2.5 wt % Fe additive (calculated by $Fe_2O_3$) and 7.5 wt % P additive (calculated by $P_2O_5$) was obtained after the calcination of the microspheres at 500° C. for 1 h.

The XRD pattern of this catalyst is shown in FIG. 4 as line o, in which the diffraction peaks at 2θ=16.30°, 2θ=26.12° and 2θ=30.92° are the characteristic diffraction peaks of FePO species.

Example 15

1.25 kg $A_7$ (dry basis), 1 kg kaolin (dry basis), 1.65 kg pseudoboehmite (dry basis), 7.2 kg deionized water and 2.79 kg alumina sol were mixed together and stirred for 120 min, then 1 L aqueous $FeCl_3.6H_2O$ solution (having 250 g $Fe_2O_3$) was added into the slurry under stirring. The pH value of the slurry is 3.0 adjusted by the dosage of HCl. After stirring for another 30 min, 465 g $(NH_4)_2HPO_4$ was added into the slurry and stirred for 30 min. Microspheres with average particle size of 65 μm were obtained by the spray-drying of the slurry at input temperature of 500° C. and exhaust temperature of 180° C. The catalyst $ZJ_{15}$ with 25 wt % $A_7$, 20 wt % kaolin, 45 wt % $Al_2O_3$, 5 wt % Fe additive (calculated by $Fe_2O_3$) and 5 wt % P additive (calculated by $P_2O_5$) was obtained after the calcination of the microspheres at 500° C. for 1 h.

The XRD pattern of this catalyst is shown in FIG. 4 as line p, in which the diffraction peaks at 2θ=16.30°, 2θ=26.12° and 2θ=30.99° are the characteristic diffraction peaks of FePO species.

Example 16

2.5 kg $A_8$ (dry basis), 1.63 kg pseudoboehmite (dry basis), 7.2 kg deionized water and 2.79 kg alumina sol were mixed together and stirred for 120 min, then 1 L aqueous $FeCl_3.6H_2O$ solution (having 270 g $Fe_2O_3$) was added into the slurry under stirring. The pH value of the slurry is 3.0. The slurry was stirred for another 45 min. Then microspheres with average particle size of 65 μm were obtained by the spray-drying of the slurry at input temperature of 500° C. and exhaust temperature of 180° C. The microspheres with 50 wt % $A_8$, 44.6 wt % $Al_2O_3$ and 5.4 wt % Fe additive (calculated by $Fe_2O_3$) were obtained after calcination at 500° C. for 1 h.

1 kg microspheres obtained above (dry basis), 10 L deionized water and 210 g $(NH_4)_2HPO_4$ were heated to 60° C. under stirring and reacted for 20 min. The slurry was vacuum-filtrated and dried. The catalyst $ZJ_{16}$ with 45 wt % $A_8$, 40.1 wt % $Al_2O_3$, 4.9 wt % Fe additive (calculated by $Fe_2O_3$) and 10 wt % P additive (calculated by $P_2O_5$) was obtained after calcination at 500° C. for 2 h.

Figure 5:
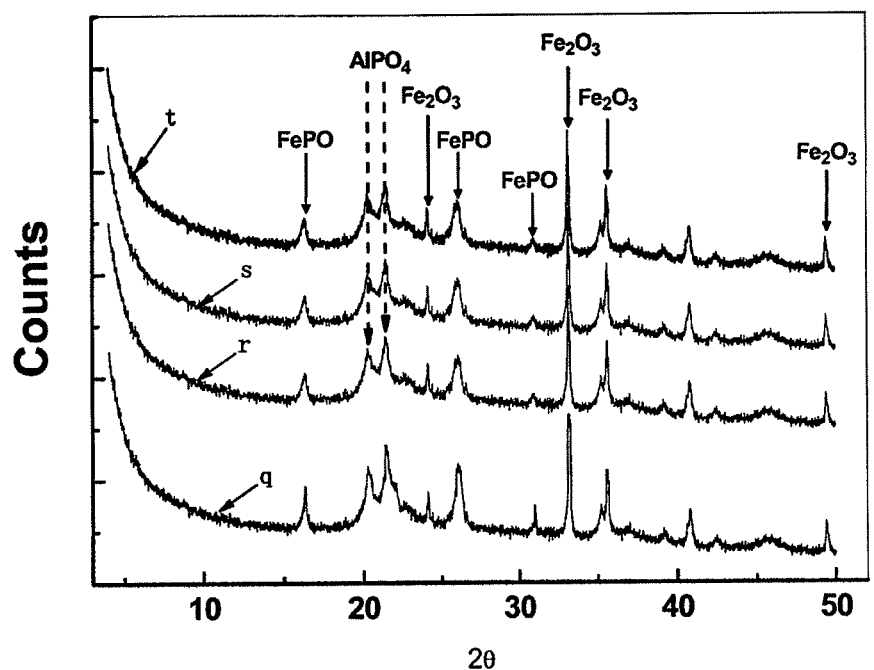

The XRD pattern of this catalyst is shown in FIG. 5 as line q, in which the diffraction peaks at 2θ=16.38°, 2θ=26.17° and 2θ=30.93° are the characteristic diffraction peaks of FePO species.

Example 17

The catalyst was prepared according to the method of Example 1, but the difference is that $A_1$ is replaced by $A_3$ with same weight. The catalyst $ZJ_{17}$ was obtained with 35 wt % $A_3$, 28 wt % kaolin, 27.5 wt % $Al_2O_3$, 2.0 wt % Fe additive (calculated by $Fe_2O_3$) and 7.5 wt % P additive (calculated by $P_2O_5$).

The XRD pattern of this catalyst is shown in FIG. 5 as line r, in which the diffraction peaks at 2θ=16.25°, 2θ=26.12° and 2θ=30.92° are the characteristic diffraction peaks of FePO species.

Example 18

The catalyst was prepared according to the method of Example 1, but the difference is that $A_1$ is replaced by $A_6$ with same weight. The catalyst $ZJ_{18}$ was obtained with 35 wt % $A_6$, 28 wt % kaolin, 27.5 wt % $Al_2O_3$, 2.0 wt % Fe additive (calculated by $Fe_2O_3$) and 7.5 wt % P additive (calculated by $P_2O_5$).

The XRD pattern of this catalyst is shown in FIG. 5 as line s, in which the diffraction peaks at 2θ=16.31°, 2θ=26.13° and 2θ=30.91° are the characteristic diffraction peaks of FePO species.

Example 19

The catalyst was prepared according to the method of Example 1, but the difference is that $A_1$ is replaced by $A_8$ with same weight. The catalyst $ZJ_{19}$ was obtained with 35 wt % $A_8$, 28 wt % kaolin, 27.5 wt % $Al_2O_3$, 2.0 wt % Fe additive (calculated by $Fe_2O_3$) and 7.5 wt % P additive (calculated by $P_2O_5$).

The XRD pattern of this catalyst is shown in FIG. 5 as line t, in which the diffraction peaks at 2θ=16.45°, 2θ=26.12° and 2θ=30.92° are the characteristic diffraction peaks of FePO species.

Comparative examples 1~5 are used to explain the preparation of comparative catalysts.

Comparative Example 1

This comparative example is used to explain the preparation of comparative catalyst containing modified ZSM-5 zeolite (sample $A_1$) and P additive, but without metal additive of Group VIIIB.

1.75 kg $A_1$ (dry basis), 1.5 kg kaolin (dry basis), 0.65 kg pseudoboehmite (dry basis), 7.2 kg deionized water and 2.79 kg alumina sol were mixed together and stirred for 120 min. Then 36 wt % HCl was added into the slurry under stirring. The dosage of HCl results in a pH value of the slurry of 3.0. After stirring for another 45 min, 1.22 kg phosphorus-alumina sol was added into the slurry and stirred evenly. Microspheres with average particle size of 65 μm were obtained by the spray-drying of the slurry at input temperature of 500° C. and exhaust temperature of 180° C. The comparative catalyst $CB_1$ with 35 wt % $A_1$, 30 wt % kaolin, 27.5 wt % $Al_2O_3$ and 7.5 wt % P additive (calculated by $P_2O_5$) was obtained after the calcination of the microspheres at 500° C. for 1 h.

The XRD pattern of this catalyst is shown in FIG. 1 as line c, in which the diffusion diffraction peak at 2θ=18.50°~23.65° is the characteristic diffraction peak of $AlPO_4$ species.

Comparative Example 2

This comparative example is used to explain the preparation of comparative catalyst containing modified ZSM-5 zeolite (sample $A_1$), but without metal additive of Group VIIIB and P additive.

1.75 kg $A_1$ (dry basis), 1.5 kg kaolin (dry basis), 1.15 kg pseudoboehmite (dry basis), 7.2 kg deionized water and 2.79 kg alumina sol were mixed together and stirred for 120 min. Then 36 wt % HCl was added into the slurry under stirring. The dosage of HCl results in a pH value of the slurry of 3.0. The slurry was stirred for another 45 min. Microspheres with average particle size of 65 μm were obtained by the spray-drying of the slurry at input temperature of 500° C. and exhaust temperature of 180° C. The comparative catalyst $CB_2$ with 35 wt % $A_1$, 30 wt % kaolin and 35 wt % $Al_2O_3$ was obtained after the calcination of the microspheres at 500° C. for 1 h.

The XRD pattern of this catalyst is shown in FIG. 1 as line d.

Comparative Example 3

This comparative example is used to explain the preparation of comparative catalyst containing conventional ZRP-5 zeolite.

The catalyst was prepared according to the method of Comparative Example 2, but the difference is that $A_1$ is replaced by ZRP-5 zeolite with same weight. The comparative catalyst $CB_3$ was obtained with 35 wt % ZRP-5 zeolite, 30 wt % kaolin and 35 wt % $Al_2O_3$.

Comparative Example 4

This comparative example is used to explain the preparation of comparative catalyst containing conventional ZRP-5 zeolite and P additive.

The catalyst was prepared according to the method of Example 1, but the difference is that $A_1$ is replaced by ZRP-5 zeolite with same weight. The comparative catalyst $CB_4$ was obtained with 35 wt % ZRP-5 zeolite, 30 wt % kaolin, 35 wt % $Al_2O_3$ and 5 wt % P additive not including the P of ZRP-5 zeolite.

Comparative Example 5

This comparative example is used to explain the preparation of comparative catalyst containing modified ZSM-5 zeolite (sample $A_1$) and metal additive of Group VIIIB, but without P additive.

1.75 kg $A_1$ (dry basis), 1.5 kg kaolin (dry basis), 0.9 kg pseudoboehmite (dry basis), 6.2 kg deionized water and 2.79 kg alumina sol were mixed together and stirred for 120 min, then 1 L aqueous $FeCl_3.6H_2O$ solution (having 250 g $Fe_2O_3$) was added into the slurry under stirring. The pH value of the slurry is 3.0. The slurry was stirred for another 45 min. Then microspheres with average particle size of 65 μm were obtained by the spray-drying of the slurry at input temperature of 500° C. and exhaust temperature of 180° C. The comparative catalyst $CB_5$ with 35 wt % $A_1$, 30 wt % kaolin, 30 wt % $Al_2O_3$ and 5 wt % Fe additive (calculated by $Fe_2O_3$) was obtained after the calcination of the microspheres at 500° C. for 1 h.

The XRD pattern of this catalyst is shown in FIG. 1 as line b, in which the diffraction peaks at 2θ=24.11°, 2θ=33.08°, 2θ=35.58° and 2θ=49.40° are the characteristic diffraction peaks of $Fe_2O_3$ species.

Examples 20~38

Examples 20~38 are used to explain the method supplied by this invention employed on the fixed fluidized-bed reactor.

30 g Catalysts $ZJ_1$-$ZJ_{19}$ were subjected to aging treatment respectively at 800° C. for 8 h under a 100% steam atmosphere. Then the catalysts $ZJ_1$-$ZJ_{19}$ after aging treatment were mixed in different content with the commercial FCC ECAT (industry trademark is MLC-500, and its main properties are listed in Table 1). The catalyst mixture was put into the reactor of a small-scaled fixed fluidized bed reaction apparatus to proceed the catalytic cracking of the feedstock shown in Table 2 (the properties of the feedstock are shown in Table 2).

The composition of catalyst mixtures, reaction condition and reaction results are listed in Table 3, Table 4 and Table 5.

Comparative Examples 6~11

Comparative Examples 6~11 are used to explain the comparative method employed on the fixed fluidized-bed reactor.

The catalytic cracking of the same feedstock is proceeded according to the method of Example 20, but the difference is that the catalyst is 100% commercial FCC ECAT or the mixture of $CB_1$~$CB_5$ and commercial FCC ECAT respectively.

The composition of catalyst mixtures used in the comparative method, reaction condition and reaction results are listed in Table 3.

TABLE 1

| Item | commercial ECAT MLC-500 |
|---|---|
| Metal content, ppm | |
| Ni/V | 9386/1665 |
| Fe/Sb | 6503/2673 |
| Ca | 1714 |
| MAT | 60 |

TABLE 2

| Feedstock | VGO blended with residuum |
|---|---|
| Density (20° C.), g/cm$^3$ | 0.9070 |
| Viscosity (100° C.), mm$^2$/s | 10.41 |
| Freeze point, ° C. | 40 |
| Carbon residue, wt % | 3.1 |

TABLE 2-continued

| Feedstock | VGO blended with residuum |
|---|---|
| Element analysis, wt % | |
| C/H | 86.39/12.53 |
| S/N | 0.8/0.29 |
| Composition, wt % | |
| Paraffin | 56.8 |
| Aromatic | 24.2 |
| Colloid | 18.2 |
| Bitumen | 0.8 |
| Metal content, ppm | |
| V/Ni | 0.8/7.0 |
| Fe/Cu | 7.8/0.1 |
| Na | 2.6 |
| Distillation, ° C. | |
| IBP/5% | 241/309 |
| 10%/20% | 343/387 |
| 30%/40% | 413/432 |
| 50%/60% | 450/466 |
| 70%/80% | 493/535 |

As seen from Table 3, Table 4 and Table 5, comparing to the method using comparative catalyst, the method supplied by this invention could increase not only the LPG yield of FCC effectively and the octane number of FCC gasoline, but also the concentration of propylene in LPG of FCC dramatically.

TABLE 3

| | Example No. | | | | | | | |
|---|---|---|---|---|---|---|---|---|
| | Comparative Example 6 | 20 | Comparative Example 7 | 21 | Comparative Example 8 | Comparative Example 9 | Comparative Example 10 | Comparative Example 11 |
| Catalyst | 100% ECAT | 10% $ZJ_1$ + 90% ECAT | 10% $CB_1$ + 90% ECAT | 10% $ZJ_2$ + 90% ECAT | 10% $CB_2$ + 90% ECAT | 10% $CB_3$ + 90% ECAT | 10% $CB_4$ + 90% ECAT | 10% $CB_4$ + 90% ECAT |
| Reaction temperature, ° C. | 500 | 500 | 500 | 500 | 500 | 500 | 500 | 500 |
| WHSV, $h^{-1}$ | 16 | 16 | 16 | 16 | 16 | 16 | 16 | 16 |
| Catalyst-to-oil, wt/wt | 5.92 | 5.92 | 5.92 | 5.92 | 5.92 | 5.92 | 5.92 | 5.92 |
| Steam (to crude oil), wt % | 0 | 0 | 0 | 0 | 0 | 0 | 0 | 0 |
| Yields, wt %: | | | | | | | | |
| Dry gas | 1.60 | 1.59 | 1.47 | 1.58 | 1.70 | 1.60 | 1.56 | 2.10 |
| LPG | 18.04 | 23.21 | 20.58 | 23.54 | 21.37 | 21.03 | 20.76 | 21.29 |
| $C_5^+$ GLN | 43.13 | 37.30 | 40.09 | 38.36 | 39.55 | 39.88 | 39.78 | 38.60 |
| LCO | 17.17 | 17.84 | 17.46 | 17.63 | 17.10 | 17.04 | 17.11 | 17.18 |
| Bottoms | 13.61 | 13.96 | 14.83 | 13.25 | 13.77 | 14.34 | 14.60 | 13.82 |
| Coke | 6.45 | 6.10 | 5.57 | 5.64 | 6.51 | 6.12 | 6.19 | 7.01 |
| Conversion, wt % | 69.23 | 68.20 | 67.71 | 69.11 | 69.13 | 68.62 | 68.30 | 69.00 |
| LPG + GLN + LCO, wt % | 78.34 | 78.36 | 78.13 | 79.53 | 78.02 | 77.95 | 77.65 | 77.07 |
| Propylene, wt % | 5.07 | 8.41 | 7.14 | 8.57 | 6.87 | 6.65 | 6.77 | 6.91 |
| 100 × propylene/LPG | 28.13 | 36.23 | 34.69 | 36.41 | 32.16 | 31.64 | 32.62 | 32.47 |
| PONA, wt % | | | | | | | | |
| Paraffins | 33.59 | 26.39 | 31.33 | 26.10 | 29.69 | 30.56 | 29.78 | 29.58 |
| Olefins | 23.89 | 26.35 | 24.86 | 25.27 | 25.4 | 24.54 | 24.93 | 25.51 |
| Naphthene | 8.26 | 8.99 | 7.98 | 9.22 | 8.2 | 8.26 | 8.5 | 8.33 |
| Aromatics | 34.08 | 38.27 | 35.66 | 39.39 | 36.48 | 36.38 | 36.44 | 36.35 |
| RON(GC) | 87.1 | 89.4 | 89.8 | 89.5 | 89.2 | 88.9 | 89.0 | 89.4 |
| MON(GC) | 82.0 | 82.6 | 82.7 | 82.6 | 82.7 | 82.7 | 82.7 | 82.8 |

TABLE 4

| | Example No. | | | | | | | |
|---|---|---|---|---|---|---|---|---|
| | 22 | 23 | 24 | 25 | 26 | 77 | 28 | 29 |
| Catalyst | 10% $ZJ_3$ + 90% ECAT | 10% $ZJ_4$ + 90% ECAT | 10% $ZJ_5$ + 90% ECAT | 12% $ZJ_6$ + 88% ECAT | 10% $ZJ_7$ + 90% ECAT | 8% $ZJ_8$ + 92% ECAT | 15% $ZJ_9$ + 85% ECAT | 15% $ZJ_{10}$ + 85% ECAT |
| Reaction temperature, ° C. | 500 | 500 | 500 | 500 | 500 | 500 | 500 | 500 |
| WHSV, $h^{-1}$ | 16 | 16 | 16 | 16 | 16 | 16 | 16 | 16 |
| Catalyst-to-oil weight ratio | 5.92 | 5.92 | 5.92 | 5.92 | 5.92 | 5.92 | 5.92 | 5.92 |
| Steam (to crude oil), wt % | 0 | 0 | 0 | 0 | 0 | 0 | 0 | 0 |
| Yields, wt %: | | | | | | | | |
| Dry gas | 1.60 | 1.62 | 1.45 | 1.56 | 1.52 | 1.41 | 1.69 | 1.71 |
| LPG | 23.46 | 24.22 | 23.58 | 25.28 | 22.18 | 22.26 | 24.49 | 23.73 |
| $C_5^+$ GLN | 38.54 | 38.75 | 37.61 | 36.65 | 39.78 | 39.26 | 35.50 | 36.16 |

TABLE 4-continued

| | Example No. | | | | | | | |
|---|---|---|---|---|---|---|---|---|
| | 22 | 23 | 24 | 25 | 26 | 77 | 28 | 29 |
| LCO | 17.49 | 16.89 | 17.82 | 17.31 | 17.38 | 17.67 | 18.55 | 18.29 |
| Bottoms | 13.14 | 12.45 | 13.89 | 13.41 | 13.39 | 13.59 | 13.59 | 14.02 |
| Coke | 5.77 | 6.06 | 5.65 | 5.79 | 5.74 | 5.80 | 6.19 | 6.09 |
| Conversion, wt % | 69.37 | 70.66 | 68.29 | 69.28 | 69.23 | 68.74 | 67.87 | 67.69 |
| LPG + GLN + LCO, wt % | 79.48 | 79.86 | 79.01 | 79.24 | 79.35 | 79.20 | 78.54 | 78.18 |
| Propylene, wt % | 8.47 | 8.66 | 8.44 | 9.12 | 8.07 | 7.90 | 9.05 | 8.53 |
| 100 × propylene/LPG | 36.11 | 35.74 | 35.79 | 36.09 | 36.39 | 35.49 | 36.94 | 35.94 |
| PONA, wt % | | | | | | | | |
| Paraffins | 25.85 | 25.06 | 24.87 | 26.37 | 26.85 | 24.26 | 28.07 | 28.36 |
| Olefins | 23.22 | 26.1 | 26.93 | 26.08 | 23.73 | 23.92 | 27.19 | 27.20 |
| Naphthene | 8.62 | 8.64 | 8.85 | 8.53 | 8.63 | 8.54 | 8.66 | 8.28 |
| Aromatics | 42.14 | 40 | 39.36 | 39.02 | 40.67 | 41.23 | 36.09 | 36.17 |
| RON(GC) | 90.0 | 89.9 | 89.5 | 89.6 | 89.9 | 89.5 | 89.7 | 89.6 |
| MON(GC) | 82.7 | 82.8 | 82.6 | 82.8 | 82.8 | 82.7 | 82.7 | 82.5 |

TABLE 5

| | Example No. | | | | | | | | |
|---|---|---|---|---|---|---|---|---|---|
| | 30 | 31 | 32 | 33 | 34 | 35 | 36 | 37 | 38 |
| Catalyst | 12% $ZJ_{11}$ + 88% ECAT | 10% $ZJ_{12}$ + 90% ECAT | 6% $ZJ_{13}$ + 94% ECAT | 10% $ZJ_{14}$ + 90% ECAT | 12% ZJ15 + 88% ECAT | 4% $ZJ_{16}$ + 96% ECAT | 8% $ZJ_{17}$ + 92% ECAT | 8% $ZJ_{18}$ + 92% ECAT | 6% ZJ19 + 92% ECAT |
| Reaction temperature, ° C. | 500 | 500 | 510 | 500 | 490 | 520 | 490 | 500 | 520 |
| WHSV, $h^{-1}$ | 16 | 16 | 10 | 16 | 20 | 10 | 20 | 30 | 10 |
| Catalyst-to-oil weight ratio | 5.0 | 4.5 | 7.0 | 5.92 | 5.0 | 6.5 | 5.5 | 7.0 | 6.5 |
| Steam (to crude oil), wt % | 5 | 5 | 5 | 5 | 5 | 10 | 10 | 10 | 10 |
| LPG, wt % | 23.41 | 23.06 | 24.62 | 22.78 | 23.78 | 22.38 | 22.56 | 24.19 | 23.56 |
| Propylene, wt % | 8.41 | 8.33 | 9.03 | 8.15 | 8.58 | 7.99 | 8.06 | 8.79 | 8.49 |
| 100 × propylene/LPG | 35.91 | 36.12 | 36.68 | 35.79 | 36.09 | 35.70 | 35.71 | 36.34 | 36.04 |
| Gasoline Olefins, wt % | 23.82 | 23.42 | 26.1 | 26.91 | 26.18 | 23.61 | 23.81 | 27.25 | 27.81 |
| RON (GC) | 90.1 | 90.1 | 89.9 | 89.7 | 89.6 | 89.8 | 89.5 | 89.8 | 89.7 |
| MON (GC) | 82.8 | 82.5 | 82.8 | 82.6 | 82.7 | 82.7 | 82.6 | 82.8 | 82.7 |

Examples 39~47

Examples 39~47 are used to explain the method supplied by this invention employed on the riser reactor.

Catalysts $ZJ_1$-$ZJ_5$, $ZJ_{10}$, $ZJ_{11}$, $ZJ_{14}$ and $ZJ_{16}$ were subjected to aging treatment respectively at 800° C. for 8 h under a 100% steam atmosphere. Then the catalysts $ZJ_1$-$ZJ_5$, $ZJ_{10}$, $ZJ_{11}$, $ZJ_{14}$ and $ZJ_{16}$ after aging treatment were mixed in different contents with MLC-500 commercial ECAT. The catalyst mixture was passed into a small-scaled FCC riser reactor continually, at the same time the feedstock shown in Table 2 or the feedstock shown in Table 2 with steam was also passed into continually, which results in the contact of the VGO and the catalyst mixture. Then the catalyst and the reaction product were separated. The separated catalyst was passed into the regenerator to be regenerated, and then the regenerated catalyst was passed back to the riser reactor. The composition of catalyst mixtures (wt %), reaction condition and reaction results are listed in Table 6 and Table 7.

Comparative Examples 12~16

Comparative Examples 12~16 are used to explain the comparative method employed on the riser reactor by using comparative catalyst.

The catalytic cracking of the same feedstock is proceeded according to the method of Example 39, but the difference is that the catalyst mixture is replaced by 100% commercial FCC ECAT, mixture of $CB_1$ and industry FCC ECAT, mixture of $CB_2$ and industry FCC ECAT, mixture of $CB_3$ and commercial FCC ECAT and mixture of $CB_4$ and commercial FCC ECAT respectively. The composition of catalyst mixtures used in comparative method, reaction condition and reaction results are listed in Table 6.

The results of Table 6 and Table 7 reveal that, comparing to the comparative method using comparative catalyst, the method supplied by this invention could increase not only the LPG yield of FCC effectively and the octane number of FCC gasoline, but also the concentration of propylene in LPG of FCC dramatically.

TABLE 6

| | Comparative Example 12 | 39 | Comparative Example 13 | 40 | Comparative Example 14 | 41 | Comparative Example 15 | Comparative Example 16 |
|---|---|---|---|---|---|---|---|---|
| Catalyst | 100% ECAT | 5% $ZJ_1$ + 95% ECAT | 5% $CB_1$ + 95% ECAT | 5% $ZJ_2$ + 95% ECAT | 5% CB2 + 95% ECAT | 5% $ZJ_3$ + 95% ECAT | 5% $CB_3$ + 95% ECAT | 5% $CB_4$ + 95% ECAT |
| Reaction time, s | | | | 2.8 | | | | |
| Regeneration temperature, °C. | | | | 670 | | | | |
| Reaction temperature, °C. | | | | 500 | | | | |
| Catalyst-to-oil | | | | 5.0 | | | | |
| Steam | | | Corresponding to 10 wt % of the crude oil | | | | | |
| Yields, wt %: | | | | | | | | |
| Dry gas | 1.73 | 1.61 | 1.78 | 1.68 | 1.70 | 1.65 | 1.76 | 1.71 |
| LPG | 11.95 | 17.23 | 14.71 | 17.03 | 14.27 | 16.97 | 14.03 | 14.23 |
| $C_5^+$ GLN | 45.71 | 40.29 | 42.61 | 40.46 | 42.57 | 41.25 | 42.80 | 43.16 |
| LCO | 17.09 | 17.14 | 17.31 | 17.30 | 17.83 | 17.18 | 17.88 | 17.28 |
| Bottoms | 17.49 | 17.78 | 17.58 | 17.57 | 17.53 | 16.94 | 17.51 | 17.61 |
| Coke | 6.03 | 5.95 | 6.01 | 5.96 | 6.10 | 6.01 | 6.02 | 6.01 |
| Conversion, wt % | 65.42 | 65.08 | 65.11 | 65.13 | 64.64 | 65.88 | 64.61 | 65.11 |
| Propylene, wt % | 3.29 | 6.49 | 5.00 | 6.60 | 4.56 | 6.30 | 4.11 | 4.47 |
| 100 × propylene/LPG | 27.55 | 37.65 | 33.98 | 38.76 | 31.96 | 37.13 | 29.27 | 31.40 |
| PONA, wt % | | | | | | | | |
| Paraffins | 28.76 | 23.62 | 25.78 | 24.26 | 25.16 | 25.58 | 25.41 | 25.37 |
| Olefins | 40.23 | 41.56 | 41.19 | 40.37 | 41.85 | 40.07 | 42.67 | 42.09 |
| Naphthene | 8.44 | 8.13 | 8.57 | 8.86 | 8.72 | 8.12 | 8.14 | 8.51 |
| Aromatics | 22.52 | 26.39 | 24.42 | 26.48 | 24.07 | 25.93 | 23.74 | 23.96 |
| RON(tested) | 87.5 | 90.1 | 89.2 | 90.1 | 89.3 | 90.0 | 89.5 | 89.5 |
| MON(tested) | 77.8 | 80.1 | 79.8 | 80.2 | 79.6 | 80.0 | 79.2 | 79.3 |

TABLE 7

| | 42 | 43 | 44 | 45 | 46 | 47 |
|---|---|---|---|---|---|---|
| Catalyst | 5% $ZJ_4$ + 95% ECAT | 5% $ZJ_5$ + 95% ECAT | 12% $ZJ_{11}$ + 88% ECAT | 8% $ZJ_{14}$ + 92% ECAT | 3% $ZJ_{16}$ + 97% ECAT | 15% $ZJ_{10}$ + 85% ECAT |
| Reaction time, s | 2.5 | 2.8 | 1.5 | 3.5 | 3.0 | 3.0 |
| Regeneration temperature, °C. | 695 | 670 | 670 | 695 | 670 | 670 |
| Reaction temperature, °C. | 490 | 500 | 500 | 510 | 515 | 495 |
| Catalyst-to-oil | 6 | 5.0 | 4 | 5.5 | 5 | 6.5 |
| Steam (corresponding to wt % of the crude oil) | 10 | 10 | 5 | 15 | 0 | 10 |
| Yields, wt %: | | | | | | |
| Dry gas | 1.69 | 1.63 | 1.71 | 1.70 | 1.82 | 1.89 |
| LPG | 18.75 | 17.01 | 21.18 | 19.15 | 15.83 | 22.07 |
| $C_5^+$ GLN | 39.28 | 40.36 | 35.17 | 40.73 | 42.41 | 35.31 |
| LCO | 17.37 | 17.25 | 17.91 | 15.79 | 17.23 | 16.98 |
| Bottoms | 16.71 | 17.84 | 18.01 | 16.52 | 16.70 | 17.53 |
| Coke | 6.20 | 5.91 | 6.02 | 6.11 | 6.01 | 6.22 |
| Conversion, wt % | 65.92 | 64.91 | 64.08 | 67.69 | 66.07 | 65.49 |
| Propylene, wt % | 7.10 | 6.32 | 8.40 | 7.29 | 5.85 | 8.44 |
| 100 × propylene/LPG | 37.87 | 37.15 | 39.68 | 38.05 | 36.98 | 38.25 |
| PONA, wt % | | | | | | |
| Paraffins | 27.61 | 24.31 | 23.16 | 26.46 | 24.31 | 27.51 |
| Olefins | 36.00 | 40.37 | 43.23 | 37.85 | 40.27 | 34.97 |
| Naphthene | 8.11 | 8.86 | 8.06 | 8.06 | 8.65 | 8.45 |
| Aromatics | 28.28 | 26.42 | 25.52 | 27.63 | 26.74 | 29.06 |
| RON(tested) | 90.1 | 90.1 | 90.5 | 89.2 | 90.1 | 90.1 |
| MON(tested) | 80.0 | 80.2 | 80.4 | 80.4 | 79.8 | 80.4 |

The invention claimed is:
1. A method of catalytic cracking of hydrocarbons comprising contacting a hydrocarbon with a catalyst under cracking conditions, and recovering the resulting product, wherein the catalyst comprises a catalyst prepared by mixing 10-65 wt % ZSM-5 zeolite which has been modified by P and one of the metals selected from Fe, Co or Ni, and having an anhydrous chemical expression, calculated by oxide, of $(0\sim0.3)Na_2O.(0.5\sim5)Al_2O_3.(1.3\sim10)P_2O_5.(0.7\sim15)M_xO_y.(70\sim97)SiO_2$, in which M is a metal selected from the group consisting of Fe, Co, or Ni, x is the atom number of M, and Y is a number needed to satisfy the oxidation state of M, 0~60 wt % clay, and 15~60 wt % inorganic oxide binder, with 0.5~15 wt % of Group VIIIB transition metal additive in which the Group VIIIB metal is Fe and 2~25 wt % P additive; spray-drying the obtained mixture; wherein said components above are calculated by dry basis and the transition metal additive and the P additive are calculated by oxide, and wherein the contents of the transition metal additive and the P additive do not include the contents of the transition metal and P in the modified ZSM-5 zeolite.

2. The method according to the claim 1, in which the anhydrous chemical expression of ZSM-5 zeolite, calculated by oxide, is

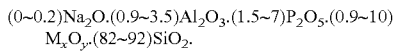
$(0\sim0.2)Na_2O.(0.9\sim3.5)Al_2O_3.(1.5\sim7)P_2O_5.(0.9\sim10)M_xO_y.(82\sim92)SiO_2$.

3. The method according to the claim 1, in which M is Fe.
4. The method according to the claim 1, in which the content of the modified ZSM-5 zeolite is 20~50 wt %, the content of the clay is 10~45 wt %, the content of the inorganic oxide binder is 25~50 wt %, the content of the Group VIIIB transition metal additive is 1.0~10 wt %, and the content of the P additive is 5~15 wt %, calculated by dry basis.
5. The method according to the claim 1, in which the clay is selected from one or mixture of more than one of kaolin, metakaolin, diatomite, sepiolite, attapulgite clay, montmorillonite and rectorite.
6. The method according to the claim 1, in which the inorganic oxide binder is selected from one or mixture of more than one of pseudoboehmite, alumina sol, silica-alumina sol, water glass and phosphorus-alumina sol.
7. The method according to the claim 1, in which the transition metal additive of Group VIIIB is introduced by adding Fe compounds to the mixture in any step before spray-drying, or introduced after spray-drying through immersion or chemical adsorption of Fe compounds and calcination.
8. The method according to the claim 7, in which the transition metal compounds are selected from the group consisting of the oxide, hydroxide, chloride, nitrate, sulphate, phosphate and organic compounds of Fe.
9. The method according to the claim 8, in which the transition metal compound at least one member selected from the group consisting of the chloride, nitrate, sulphate and phosphate of Fe.
10. The method according to the claim 1, in which the P additive is introduced by adding phosphorus compounds to the mixture before spray-drying.
11. The method according to the claim 1, in which the P additive is introduced by phosphorus-alumina sol.
12. The method according to the claim 1, in which the the contacting takes place in a fixed bed reactor.
13. The method according to the claim 1, in which propylene is recovered from said resulting product.
14. The method according to the claim 1, modified zeolite is at least one member selected from the group represented by the anhydrous chemical expressions, calculated by oxide, of

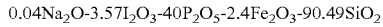
$0.04Na_2O-3.57I_2O_3-40P_2O_5-2.4Fe_2O_3-90.49SiO_2$

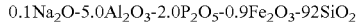
$0.1Na_2O-5.0Al_2O_3-2.0P_2O_5-0.9Fe_2O_3-92SiO_2$

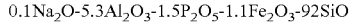
$0.1Na_2O-5.3Al_2O_3-1.5P_2O_5-1.1Fe_2O_3-92SiO$

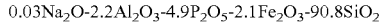
$0.03Na_2O-2.2Al_2O_3-4.9P_2O_5-2.1Fe_2O_3-90.8SiO_2$

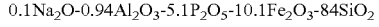
$0.1Na_2O-0.94Al_2O_3-5.1P_2O_5-10.1Fe_2O_3-84SiO_2$

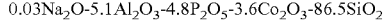
$0.03Na_2O-5.1Al_2O_3-4.8P_2O_5-3.6Co_2O_3-86.5SiO_2$

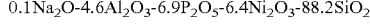
$0.1Na_2O-4.6Al_2O_3-6.9P_2O_5-6.4Ni_2O_3-88.2SiO_2$

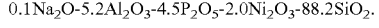
$0.1Na_2O-5.2Al_2O_3-4.5P_2O_5-2.0Ni_2O_3-88.2SiO_2$.

* * * * *